Feb. 13, 1940.   W. A. STONE   2,189,968
ATTACHMENT FOR LATHES
Filed July 6, 1939

INVENTOR.
WALTER A. STONE
BY Philip S Hopkins
ATTORNEY.

Patented Feb. 13, 1940

2,189,968

UNITED STATES PATENT OFFICE 2,189,968

ATTACHMENT FOR LATHES

Walter A. Stone, Endwell, N. Y.

Application July 6, 1938, Serial No. 217,809

3 Claims. (Cl. 82—34)

This invention relates to attachments for lathes and more particularly to a device adapted to be positioned in the feed tube of a lathe to act as a stop, whereby in the case of a member requiring a machined operation at each end thereof the member may be merely reversed and the position of the stop determine the proper position of the member.

A primary object of this invention is the provision of such a stop which may be positioned in the feed tube of a lathe at any desired point therein and held in its desired position without the necessity of the use of set screws or analogous devices.

As conductive to a clearer understanding of this invention it may here be pointed out that in certain types of work requiring the use of a machine or hand lathe or a screw machine or analogous device the work being operated upon may require identical or similar machine operations at opposite ends thereof. In such cases it is customary to position a stop in the feed tube of the lathe or other machine at a definite measured position therein whereby, when the operator has completed the required machining of one end of the work, he may simply reverse the same and insert the machined end thereof into the feed tube, which end, when it abuts the stop, indicates that the work is in proper measured position for machining of the other end. Heretofore such stops have been held in place by various mechanisms which required disarrangement of the machine, as in the case of set screws having their heads positioned exteriorly of the feed tube, in which case it has hitherto been necessary to tap the feed tube and thread the holes so tapped.

It is an object of this invention, therefore, to provide a stop which may be inserted in a feed tube and secured in position therein without the necessity of tapping the tube or resorting to any disarrangement of the mechanism of the lathe whatsoever.

Other objects will in part be obvious and in part pointed out hereinafter.

The invention accordingly consists in the combinations of elements, arrangements of parts and features of construction all as will be more fully pointed out and shown in the accompanying drawing wherein.

Similar reference characters refer to similar parts throughout the several views of the drawing.

Figure 1:
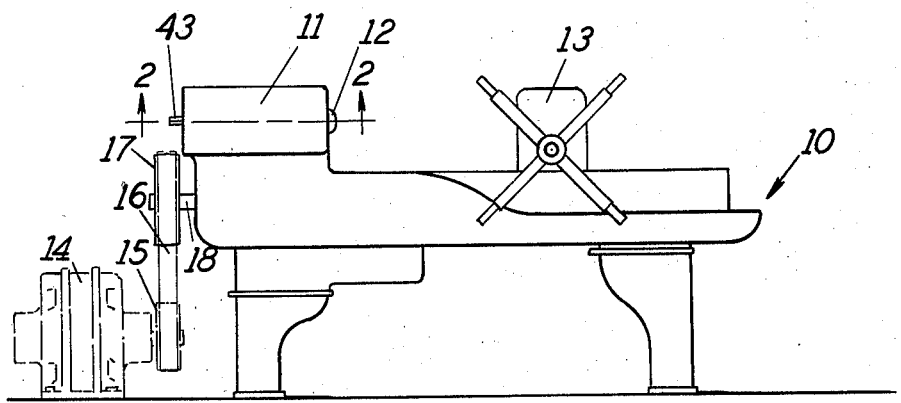
Figure 1 is a side elevational view of a conventional lathe.

Having reference now to Figure 1 there is disclosed a conventional lathe generally indicated at 10, of any desired type including a head 11 provided with a live center 12 and a work holder or tool carriage 13 provided with a dead center (not shown). Power may be supplied to the lathe in any suitable manner as by means of a motor 14 connected by means of a drive wheel 15 and belt 16 to a drive pulley 17 connected to a drive shaft 18. The interior of head 11 may be of any conventional construction but is provided with a centrally located feed tube 20 and suitable pulleys 21 connected in any desired manner to drive shaft 18 to permit rotation of the work.

The device of the instant invention comprises a stop 25 provided at its extremity with a suitably designed aperture 26 to accommodate the end of any desired piece of work as indicated in dotted lines at 27. Suitable locking jaws (not shown) or a locking key 28 (see Figure 3) are provided in order that the work may be held in rigid relationship with the stop and hence the feed tube.

Figure 3:
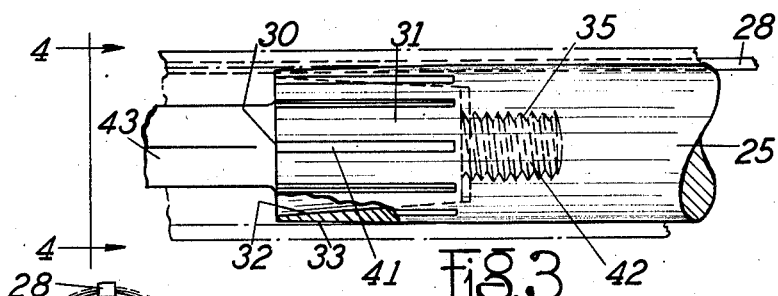
Figure 3 is an enlarged detail view showing the locking mechanism of the stop of the instant invention.
Figure 4:
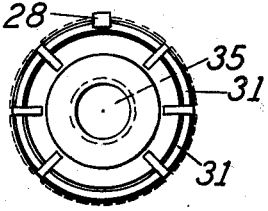
Figure 4 is a sectional view taken along the line 4—4 of Figure 3 as viewed from the left.

Having reference now to Figure 3 the end of stop 25 opposite aperture 26 is provided with a cup or recess 30 surrounded by tongues 31 tapered both internally and externally as indicated at 32 and 33. Extending inwardly from the bottom of recess 30 is a threaded aperture 35. Locking of the stop in the feed tube is effected by expansion of tongues 31 and their tight frictional engagement with the sides of the feed tube in a manner now to be described.

A key or expander generally indicated at 40 is adapted to be fitted into recess 30. Expander 40 is comprised of a tapered end portion 41 of a diameter adapted to fit closely within recess 30 and provided at its extremity with a threaded member 42 adapted to engage threaded recess 35, and a shaft 43 which extends from member 41 to the exterior of the feed tube and housing 11 in such manner that it may be rotated by any suitable tool positioned in related assembly therewith.

Figure 2:
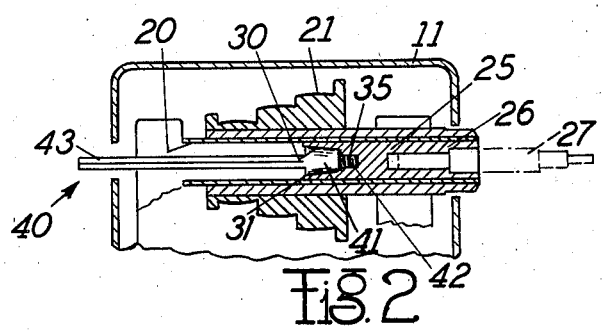
Figure 2 is an enlarged sectional view taken substantially along the line 2—2 of Figure 1.

From the foregoing the operation of the device should be readily understood. Stop 25 is fitted into feed tube 20 from the left as viewed in Figures 1 and 2 and the distance of the base of aperture 26 from the tool holder 13 carefully measured in any desired manner. Expander 40 is then introduced into recess 30 and rotated in such manner that threaded extremity 42 engages threaded aperture 35. As such rotation is continued tapered member 41 causes tapered tongue 31 to expand into tight frictional engagement with the sides of feed tube 20 which engagement holds stop 25 in the desired position until such time as reverse rotation of shaft 43 causes retraction of tapered member 41 to permit resilient contraction of tongues 31 whereupon the stop may be removed or shifted to a new position in the feed tube.

It will now be seen that there is herein provided a stop which may be positioned in the feed tube of any lathe or analogous device and retained at a desired point therein without the necessity of tapping the head of the machine or introducing set screws into the feed tube.

It will further be seen that there is herein provided a structure which accomplishes all the objects of this invention and others including many advantages of great practical utility.

As many embodiments may be made of the inventive concept herein shown and described and as many modifications may be made of the embodiment herein set forth, it is to be understood that all matters hereinbefore described or shown in the accompanying drawing is to be interpreted merely as illustrative and not in a limiting sense.

I claim as my invention:

1. A stop for positioning in the feed tube of a work holding machine comprising a member provided at one end with work engaging means and at its other end with a recessed portion provided with a threaded cup at its inner extremity, a plurality of resilient members forming the sides of said recessed portion, means to expand said members into relatively tight frictional engagement with the bore of said feed tube and retain the same in said engagement, said last mentioned means comprising a member provided with a threaded portion engaging said cup, a conical portion serving to expand said resilient members as said threaded portion is screwed into said cup.

2. A stop for positioning in the feed tube of a work holding machine comprising a member provided at one end with a work holding recess and at the other end with a plurality of expansible members adapted to expand into relatively tight frictional engagement with the bore of said feed tube and means to expand said members.

3. A stop for positioning in the feed tube of a work holding machine comprising a member provided at one end with a work holding recess and at the other end with a plurality of expansible members adapted to expand into relatively tight frictional engagement with the bore of said feed tube and means to expand said members, said last mentioned means comprising a key having a conical portion adapted upon insertion between said resilient members to force the same towards said tube.

WALTER A. STONE.